United States Patent
Binder et al.

(10) Patent No.: US 10,086,689 B2
(45) Date of Patent: Oct. 2, 2018

(54) VENTING VALVE

(71) Applicant: MAGNA STEYR Fuel Systems GesmbH, Sinabelkirchen (AT)

(72) Inventors: Michael Binder, Gleisdorf (AT); Eduard Eggenreich, Weiz (AT); Fabien Gorlier, Graz (AT); René Hendler, Graz (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 22 days.

(21) Appl. No.: 15/001,569

(22) Filed: Jan. 20, 2016

(65) Prior Publication Data
US 2016/0207395 A1 Jul. 21, 2016

(30) Foreign Application Priority Data
Jan. 20, 2015 (EP) .................... 15151775

(51) Int. Cl.
| | |
|---|---|
| *B60K 15/035* | (2006.01) |
| *F17C 13/06* | (2006.01) |
| *F17C 3/00* | (2006.01) |
| *F17C 13/12* | (2006.01) |
| *B60K 15/03* | (2006.01) |

(52) U.S. Cl.
CPC .. *B60K 15/03504* (2013.01); *B60K 15/03519* (2013.01); *F17C 3/00* (2013.01); *F17C 13/06* (2013.01); *F17C 13/126* (2013.01); *B60K 2015/03263* (2013.01); *B60K 2015/03289* (2013.01); *B60K 2015/03509* (2013.01); *B60K 2015/03514* (2013.01); *B60K 2015/03552* (2013.01)

(58) Field of Classification Search
CPC ......... Y10T 137/0874; Y10T 137/3099; Y10T 137/7841; Y10T 137/7404
USPC .................................................. 137/202, 43
See application file for complete search history.

(56) References Cited

U.S. PATENT DOCUMENTS

| | | | | |
|---|---|---|---|---|
| 3,620,240 A | * | 11/1971 | Bogdanski | F16K 15/0406 137/202 |
| 4,685,584 A | * | 8/1987 | Harris | B60K 15/0406 137/202 |
| 5,131,439 A | | 7/1992 | Bucci | |
| 5,782,258 A | * | 7/1998 | Herbon | B60K 15/03519 137/202 |
| 6,016,828 A | * | 1/2000 | Machledt | F16K 24/046 137/202 |
| 6,302,133 B1 | | 10/2001 | Kobayashi et al. | |

(Continued)

FOREIGN PATENT DOCUMENTS

| | | |
|---|---|---|
| CN | 1715092 A | 1/2006 |
| CN | 102083646 A | 6/2011 |
| CN | 102529696 A | 7/2012 |

(Continued)

OTHER PUBLICATIONS

Office Action for Chinese Patent Application No. 201510994354.7, dated Sep. 21, 2017, 9 pages including 5 pages of English translation.

*Primary Examiner* — Shawn M Braden
(74) *Attorney, Agent, or Firm* — Jordan IP Law, LLC; Todd A. Vaughn

(57) ABSTRACT

A ventilation valve and a tank device that includes such a ventilation valve, which fulfills both a roll-over function and an overflow protection function.

16 Claims, 1 Drawing Sheet

(56) References Cited

U.S. PATENT DOCUMENTS 6,739,350 B1 * 5/2004 Op De Beeck .. B60K 15/03504
123/519
6,848,465 B1 * 2/2005 Ledbetter .............. F16K 24/044
137/202

FOREIGN PATENT DOCUMENTS

| CN | 103429452 A | 12/2013 |
| --- | --- | --- |
| DE | 4121324 A1 | 1/1993 |
| DE | 19542703 A1 | 5/1997 |
| DE | 102006004630 A1 | 8/2007 |
| WO | 86/02888 A1 | 5/1986 |

* cited by examiner

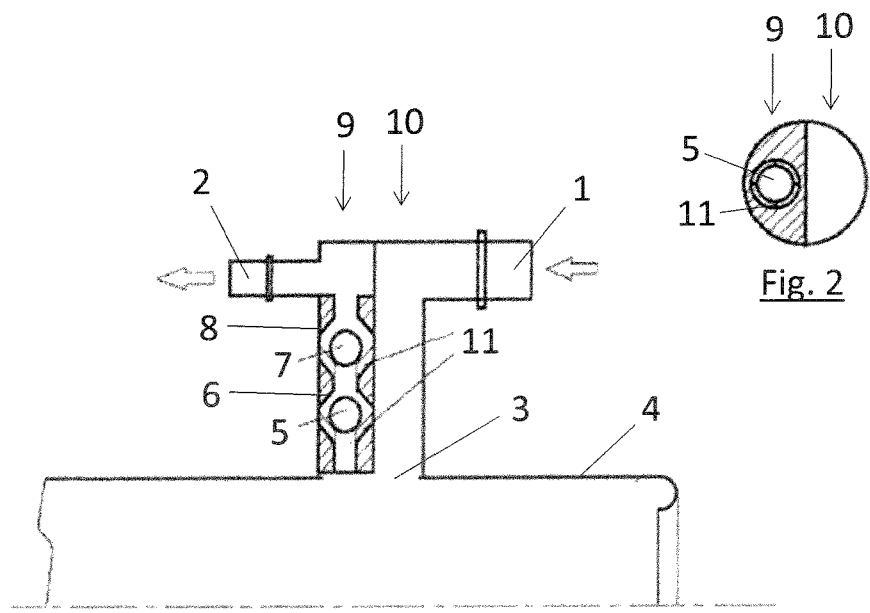
Fig. 1
Fig. 2
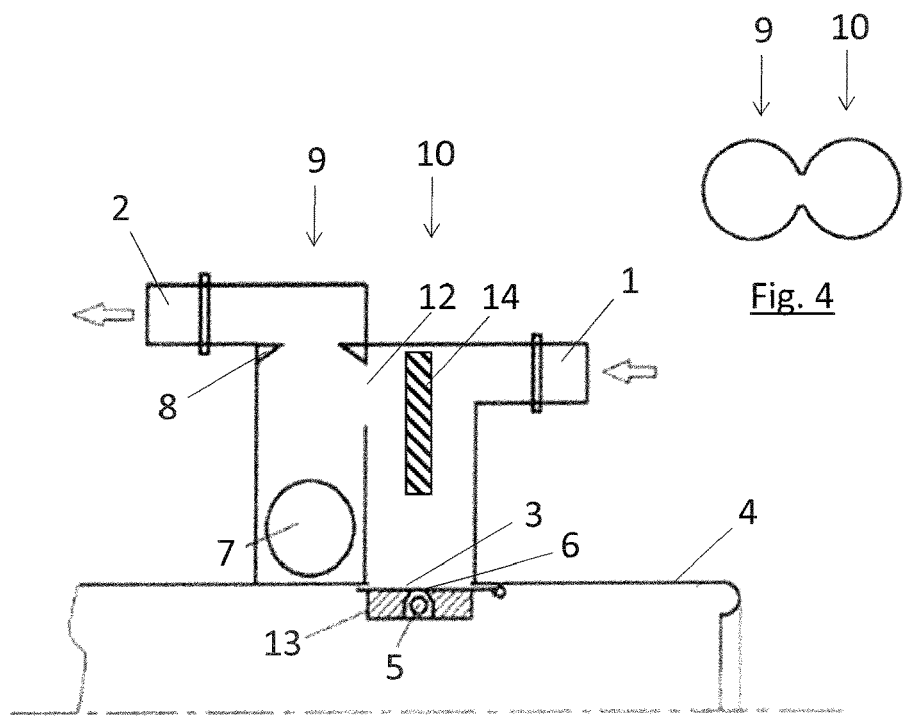
Fig. 3
Fig. 4

VENTING VALVE

CROSS-REFERENCE TO RELATED APPLICATIONS

The present application claims priority 35 U.S.C. § 119 to European Patent Publication No. on EP15151775.2 (filed on Jan. 20, 2015), which is hereby incorporated by reference in its complete entirety.

TECHNICAL FIELD

Embodiments relate to a ventilation valve for a fuel tank, and a tank device comprising such a ventilation valve.

BACKGROUND

Such ventilation valves are used, in particular, for venting fuel tanks in motor vehicles and permit a ventilation and aeration of the tank during normal operation and/or when filling the tank. This is accomplished by creating a connection relative to the surroundings of the tank, i.e., the air outside the tank and/or the vehicle. The connection relative to the ambient air generally takes place via an active carbon filter. Such ventilation valves may be arranged on a filler neck of the fuel tank and may be positioned, for example, as valve nipples on a filler neck.

For tank devices in vehicles it is also known that said tank devices are able to implement a so-called roll-over function, i.e., have an ability to close a connection of the tank relative to the surroundings in a specific oblique position, in particular when the vehicle rolls over, so that fuel is prevented from escaping after accidents.

For tank devices in vehicles it is also known to provide protection from "continuously operating fuel nozzles", i.e., protection against overflow, which ensures the closure of a connection of the tank when the fuel in the tank rises above a predetermined level.

SUMMARY

Embodiments relate to an alternative ventilation valve and a tank device comprising such a ventilation valve, which fulfills both a roll-over function and an overflow protection function.

Embodiments relate to a ventilation valve for a fuel tank, comprising a ventilation inlet which is to be connected to a ventilation line of the fuel tank, a ventilation outlet which is to be connected to the surroundings, and a filler neck opening which is to be connected to a filler neck of the fuel tank, wherein the ventilation valve comprises a first closure body of low density, a first sealing seat for the first closure body, a second closure body of high density, and a second sealing seat for the second closure body which is different from the first sealing seat, wherein in the installed position the first sealing seat is arranged spatially above the first closure body and the second sealing seat is arranged spatially above the second closure body.

In accordance with embodiments, therefore, two different closure bodies with respectively assigned valve seats are provided in a ventilation valve.

In accordance with embodiments, "high density" means a density which is greater than the density of the fuel provided in the tank, so that the closure body of high density sinks to the bottom of the fuel by gravitational force and "low density" means a density which is lower than the density of the fuel provided in the tank so that the closure body of low density rises in the fuel.

In accordance with embodiments, therefore, in a conventional installed position of the ventilation valve, when fuel rises spatially above the level of the first closure body, the first closure body, which has a low density, is pressed against the first sealing seat spatially above the first closure body. Consequently, the first sealing seat is closed in the event of an overflow. The second closure body of high density, in normal operation, is located spatially below the second sealing seat and, for example, in the event of a rolled-over position, falls onto the second sealing seat so that in the case of a sufficiently oblique position or rolled-over position the second sealing seat is closed.

The two cited functions are, therefore, integrated in a single component but due to the separate closure bodies and sealing seats both functions may be reliably carried out independently of one another.

In accordance with embodiments, in the installed position of the ventilation valve, the first closure body is spatially arranged at a lower level than the second closure body, in particular, in the region of the filler neck opening. As a result, the first sealing seat may be rapidly closed in the event of rising fuel.

In accordance with embodiments, the ventilation valve comprises a first chamber which is in fluidic connection with the ventilation outlet and with the filler neck opening and a second chamber which is in fluidic connection with the ventilation inlet and with the filler neck opening. The two chambers are not in direct fluidic connection with one another but only via the filler neck. The fluidic connection in this case only has to be respectively present in normal operation in which the two closure bodies are not positioned on their sealing seats and thus do not close the connections.

In accordance with embodiments, the first closure body, the first sealing seat, the second closure body and the second sealing seat are thus arranged in or on the first chamber. "On" the chamber in this case means an arrangement in the region of the limits of the chamber, in particular at an axial end of the chamber.

In accordance with embodiments, in the installed position in normal operation, the first closure body and/or the second closure body is positioned on a gas-permeable and also liquid-permeable structure, in particular on ribs, so that air and/or fuel is able to pass through the respective closure body.

In accordance with embodiments, the ventilation valve comprises a first chamber which is in fluidic connection with the ventilation outlet and a second chamber which is in fluidic connection with the ventilation inlet and with the filler neck opening, wherein the first chamber is in fluidic connection with the second chamber via a through-opening.

In accordance with embodiments, the first closure body and the first sealing seat are arranged in or on the second chamber, and the second closure body and the second sealing seat are arranged in or on the first chamber.

In accordance with embodiments, in the installed position, the through-opening between the first chamber and the second chamber is arranged spatially below the second sealing seat, so that both chambers are able to be closed by the second closure body.

In accordance with embodiments, the first closure body and/or the second closure body is configured as a ball, particularly both closure bodies are configured as balls.

In accordance with embodiments, the first closure body may be configured in a flap. The flap may be arranged on the filler neck opening, and in a closed state, bears against the outer face of the filler neck opening. The flap may thus be pressed upwardly by the introduction of a fuel nozzle into the filler neck so that a seal is made on the filler neck opening.

In accordance with embodiments, the ventilation valve may be configured as a valve nipple.

In accordance with embodiments, a tank device comprises a fuel tank, a filler neck for filling the fuel tank, a ventilation line connected to the fuel tank, as well as a ventilation valve as disclosed above, wherein the ventilation inlet is connected to the ventilation line of the fuel tank, the ventilation outlet is connected to the surroundings, via an active carbon filter, and the filler neck opening is connected to the filler neck of the fuel tank.

DRAWINGS

Embodiments will be illustrated by way of example in the drawings and explained in the description below.

FIG. 1 illustrates, in a schematic front sectional view, a ventilation valve in accordance with embodiments.

FIG. 2 illustrates, in a schematic top sectional view, the ventilation valve of FIG. 1, in accordance with embodiments.

FIG. 3 illustrates, in a schematic front sectional view, a ventilation valve in accordance with embodiments.

FIG. 4 illustrates, in a schematic top sectional view, the ventilation valve of FIG. 3, in accordance with embodiments.

DESCRIPTION

As illustrated in FIG. 1, a first embodiment of a ventilation valve and/or a tank device comprising such a ventilation valve is provided. The ventilation valve is configured as a valve nipple and has a ventilation inlet 1 which is to be connected or is connected to a ventilation line of the fuel tank, a ventilation outlet 2 which is to be connected or is connected to an active carbon filter and subsequently to the surroundings, and a filler neck opening 3 which is connected to a filler neck 4 of the fuel tank.

The ventilation valve is divided into two chambers. A first chamber 9 is in fluidic connection with the ventilation outlet 2, the filler neck opening 3, and thus, the filler neck 4. A second chamber 10 is in fluidic connection with the ventilation inlet 1, the filler neck opening 3, and thus, the filler neck 4. The first chamber 9 is not in direct fluidic connection with the second chamber 10, but is indirect fluidic connection via the filler neck 4. The spatial separation of the first chamber 9 and the second chamber 10 results in a separating function which acts in the manner of a bulkhead.

The ventilation valve comprises a first closure body 5 of low density which in normal operation is positioned on ribs 11. Via the first closure body 5, a first sealing seat 6 is formed for the first closure body 5. A second closure body 7 of high density is positioned spatially above the first closure body 5 and the first sealing seat 6 in the first chamber 9, also on ribs 11. A second sealing seat 8 for the second closure body 7, which is different from the first sealing seat 6, is arranged spatially above the second closure body 7.

As illustrated in FIG. 2, the ventilation valve of FIG. 1 is provided in a sectional view through the first closure body 5. The ventilation valve is configured as a cylinder with a round cross-section, and is divided in the center by a planar partition wall so that the first chamber 9 and the second chamber 10 have a semi-circular cross section.

As illustrated in FIG. 3, a ventilation valve in accordance with embodiments comprises a first chamber 9 which is in fluidic connection with a ventilation outlet 2, and a second chamber 10 which is in fluidic connection with a ventilation inlet 1, the filler neck opening 3, and thus, the filler neck 4. The first chamber 9 is in fluidic connection with the second chamber 10 via a through-opening 12, wherein in the installed position the through-opening 12 is configured spatially below the second sealing seat 8 and spatially above the second closure body 7.

The first closure body 5 and the first sealing seat 6 are arranged in or on the second chamber 10, and the second closure body 7 and the second sealing seat 8 are arranged in the first chamber 9.

The second closure body 7 is configured as a ball. For example, a cone might also be possible as a second closure body 7.

The first closure body 5 is configured as a ball and integrated in a flap 13, wherein the integrated ball 5 also has a low density. The flap 13 is arranged spatially on the filler neck opening 3, and may be pressed upwardly by introducing a fuel nozzle, so that a seal is made. The first closure body 5 in the flap 13 is to float on fuel in order to bear against the first sealing seat 6, and thus, sealingly close the access from the filler neck 4 to the second chamber 10.

The use of balls, cones or even flaps as closure bodies is not limited to the embodiments set forth. Generally the use of balls, flaps and other sealing bodies, such as for example cones, is possible for both closure bodies in any configuration of the chambers. Thus, for example, in the embodiment of FIG. 1, a cone could also be used as the first closure body 5.

In FIG. 3, a partition wall or even a cyclone geometry or any other separating geometry 14 is integrated in the second chamber 10 in order to separate the liquid droplets from the gas (tank ventilation coming from the ventilation inlet 1).

As illustrated in FIG. 4, a sectional view of the ventilation valve of FIG. 3 in which the two chambers 9, 10 in each case are substantially configured with a round cross-section.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second", etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 Ventilation inlet
2 Ventilation outlet

3 Filler neck opening
4 Filler neck
5 First closure body
6 First sealing seat
7 Second closure body
8 Second sealing seat
9 First chamber
10 Second chamber
11 Ribs
12 Through-opening
13 Flap
14 Separating geometry

What is claimed is:

1. A ventilation valve for a fuel tank, comprising: a ventilation inlet for fluidic connection to a ventilation line of the fuel tank; a ventilation outlet for fluidic connection to outer surroundings of the ventilation valve; a filler neck opening for fluidic connection to a filler neck of the fuel tank; a first closure body of low density; a first sealing seat for the first closure body; a second closure body of high density; a second sealing seat for the second closure body which is different from the first sealing seat; a first chamber in fluidic connection with the ventilation outlet and the filler neck opening; and a second chamber in fluidic connection with the ventilation inlet and the filler neck opening such that the first chamber is not in direct fluidic connection with the second chamber, wherein in an installed position, the first sealing seat is arranged spatially above the first closure body and the second sealing seat is arranged spatially above the second closure body,
wherein the first closure body, the first sealing seat, the second closure body, and the second sealing seat are arranged in or on the first chamber.

2. The ventilation valve of claim 1, wherein in the installed position the first closure body is arranged at a level lower than the second closure body, and in a region of the filler neck opening.

3. The ventilation valve of claim 1, wherein in the installed position and in normal operation, the first closure body and/or the second closure body is positioned on ribs composed of a gas-permeable and also liquid-permeable material.

4. The ventilation valve of claim 1, further comprising:
a first chamber in fluidic connection with the ventilation outlet; and
a second chamber in fluidic connection with the ventilation inlet and the filler neck opening,
wherein the first chamber is in direct fluidic connection with the second chamber via a through opening.

5. The ventilation valve of claim 4, wherein the first closure body and the first sealing seat are arranged in or on the second chamber, and the second closure body and the second sealing seat are arranged in or on the first chamber.

6. The ventilation valve of claim 4, wherein in the installed position, the through-opening is arranged spatially below the second sealing seat.

7. The ventilation valve of claim 4, wherein a separating geometry is integrated in the second chamber.

8. The ventilation valve of claim 1, wherein the first closure body and/or the second closure body comprises a ball.

9. The ventilation valve of claim 1, wherein the first closure body comprises a flap.

10. The ventilation valve of claim 9, wherein the flap is arranged on the filler neck opening and in a closed state bears against the outer face of the filler neck opening.

11. The ventilation valve of claim 1, wherein the ventilation valve comprises a valve nipple.

12. A tank device, comprising: a fuel tank; a filler neck for filling the fuel tank; a ventilation line for fluidic connection to the fuel tank; and a ventilation valve including a ventilation inlet for fluidic connection to the ventilation line, a ventilation outlet for fluidic connection to outer surroundings of the ventilation valve, a filler neck opening for fluidic connection to the filler neck, a first closure body of low density, a first sealing seat for the first closure body, a second closure body of high density, and a second sealing seat for the second closure body which is different from the first sealing seat; a first chamber in fluidic connection with the ventilation outlet and the filler neck opening; and a second chamber in fluidic connection with the ventilation inlet and the filler neck opening such that the first chamber and the second chamber are in fluidic connection with each other only via the filler neck opening, wherein in an installed position, the first sealing seat is arranged spatially above the first closure body and the second sealing seat is arranged spatially above the second closure body,
wherein the first closure body, the first sealing seat, the second closure body, and the second sealing seat are arranged in or on the first chamber.

13. The tank device of claim 12, wherein in the installed position and in normal operation, the first closure body and/or the second closure body is positioned on ribs composed of a gas-permeable and also liquid-permeable material.

14. The tank device of claim 12, wherein the ventilation valve further comprises:
a first chamber in fluidic connection with the ventilation outlet; and
a second chamber in fluidic connection with the ventilation inlet and the filler neck opening,
wherein the first chamber is in direct fluidic connection with the second chamber via a through opening.

15. The tank device of claim 14, wherein the first closure body and the first sealing seat are arranged in or on the second chamber, and the second closure body and the second sealing seat are arranged in or on the first chamber.

16. The tank device of claim 14, wherein in the installed position, the through-opening is arranged spatially below the second sealing seat.

* * * * *